(12) United States Patent
Miller

(10) Patent No.: US 8,418,227 B2
(45) Date of Patent: Apr. 9, 2013

(54) KEYSTROKE LOGGER FOR UNIX-BASED SYSTEMS

(75) Inventor: Andrew G. Miller, Land O' Lakes, FL (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 813 days.

(21) Appl. No.: 12/545,482

(22) Filed: Aug. 21, 2009

(65) Prior Publication Data
US 2011/0047596 A1    Feb. 24, 2011

(51) Int. Cl.
G06F 21/00    (2006.01)

(52) U.S. Cl. ............................. 726/3; 713/186; 709/225

(58) Field of Classification Search ...... 726/3; 709/225; 713/186
See application file for complete search history.

(56) References Cited

U.S. PATENT DOCUMENTS

| | | | | |
|---|---|---|---|---|
| 2003/0046587 A1* | 3/2003 | Bheemarasetti et al. | ..... | 713/201 |
| 2003/0233583 A1* | 12/2003 | Carley | .......... | 713/201 |
| 2005/0086494 A1* | 4/2005 | Carley | .......... | 713/182 |
| 2005/0114712 A1* | 5/2005 | Devine et al. | ........... | 713/201 |
| 2005/0210296 A1* | 9/2005 | Devine et al. | ........... | 713/201 |
| 2006/0048216 A1* | 3/2006 | Hinton et al. | ........... | 726/8 |
| 2006/0080542 A1* | 4/2006 | Takeuchi et al. | ........... | 713/182 |
| 2006/0130142 A1* | 6/2006 | Mester et al. | ........... | 726/23 |
| 2006/0285692 A1* | 12/2006 | Kerstens et al. | ........... | 380/270 |
| 2007/0180493 A1* | 8/2007 | Croft et al. | ........... | 726/2 |
| 2008/0047009 A1* | 2/2008 | Overcash et al. | ........... | 726/23 |
| 2008/0072291 A1* | 3/2008 | Carley | ........... | 726/3 |
| 2008/0196009 A1* | 8/2008 | Son et al. | ........... | 717/120 |
| 2008/0222532 A1* | 9/2008 | Mester et al. | ........... | 715/738 |
| 2009/0165105 A1* | 6/2009 | Chaudhry | ........... | 726/7 |
| 2009/0222907 A1* | 9/2009 | Guichard | ........... | 726/17 |

OTHER PUBLICATIONS

Syslog—"Syslog is a standard for computer data logging"—Wikipedia.*

* cited by examiner

*Primary Examiner* — Hadi Armouche
*Assistant Examiner* — Shan Elahi

(57) ABSTRACT

A device receives, from an Internet program manager (IPM) server, an identification (ID) of a user associated with a user device and an Internet protocol (IP) address of the user device, and connects to the user device based on the user ID and the IP address of the user device. The device also receives, from the IPM server, a request to execute a logging application for the user device, and executes the logging application based on the request. The device further receives, via the logging application, one or more inputs or outputs associated with the user device, and records the one or more inputs or outputs associated with the user device.

23 Claims, 10 Drawing Sheets

FIG. 6

| PASSWORDS | TYPED TEXT | CUT/PASTE TEXT | OTHER INPUTS/ OUTPUTS |
|---|---|---|---|
| PASSWORD1 | AAA | The defective server ... | * * * |
| PASSWORD2 | BBB | The network element ... | * * * |
| PASSWORD3 | CCC | The protocol ... | * * * |

FIG. 7

1. `hostname`.YYYYMMDD_HHMMSS.PID-#_ID.log ← 710 v203130's password:
Authentication successful.
Last login: Thu Apr 16 2009 08:58:47 -0400 from andrewlinux.site.com
No mail.
$ date
Thu Apr 16 09:01:56 EDT 2009
$ vi config.ini
^[?1048h^[?1047h^[?1h^[=^[[1;24r^[[?25h^[[?25l^[[27m^[[m^[[H^[[2J^[[?25l^[[24;1H"config.ini" 4L, 16C^[[1;1Hjunk
junk
junk
[[1;1H^[[?25h^[[?25l^[[m^[[24;1H^[[K^[[24;1H^[[?25hwq^M^[[?25l"config.ini" 4L, 16C written^
$ exit
Connection to nvttp01.site.com closed.

2. `hostname`.YYYYMMDD_HHMMSS.PID-#_Trace-Parent.log ← 720

[2009-04-16 09:02:00] Key press: 0x0064, 1:'d' 7bit
[2009-04-16 09:02:00] Key press: 0x0061, 1:'a' 7bit
[2009-04-16 09:02:00] Key press: 0x0074, 1:'t' 7bit
[2009-04-16 09:02:00] Key press: 0x0065, 1:'e' 7bit
[2009-04-16 09:02:01] Key press: 0xFF0D, 1:'\r' 7bit
[2009-04-16 09:02:01] Key press: 0x0076, 1:'v' 7bit
[2009-04-16 09:02:01] Key press: 0x0069, 1:'i' 7bit
[2009-04-16 09:02:02] Key press: 0x0020, 1:' ' 7bit
[2009-04-16 09:02:02] Key press: 0x0063, 1:'c' 7bit
[2009-04-16 09:02:02] Key press: 0x006F, 1:'o' 7bit

700

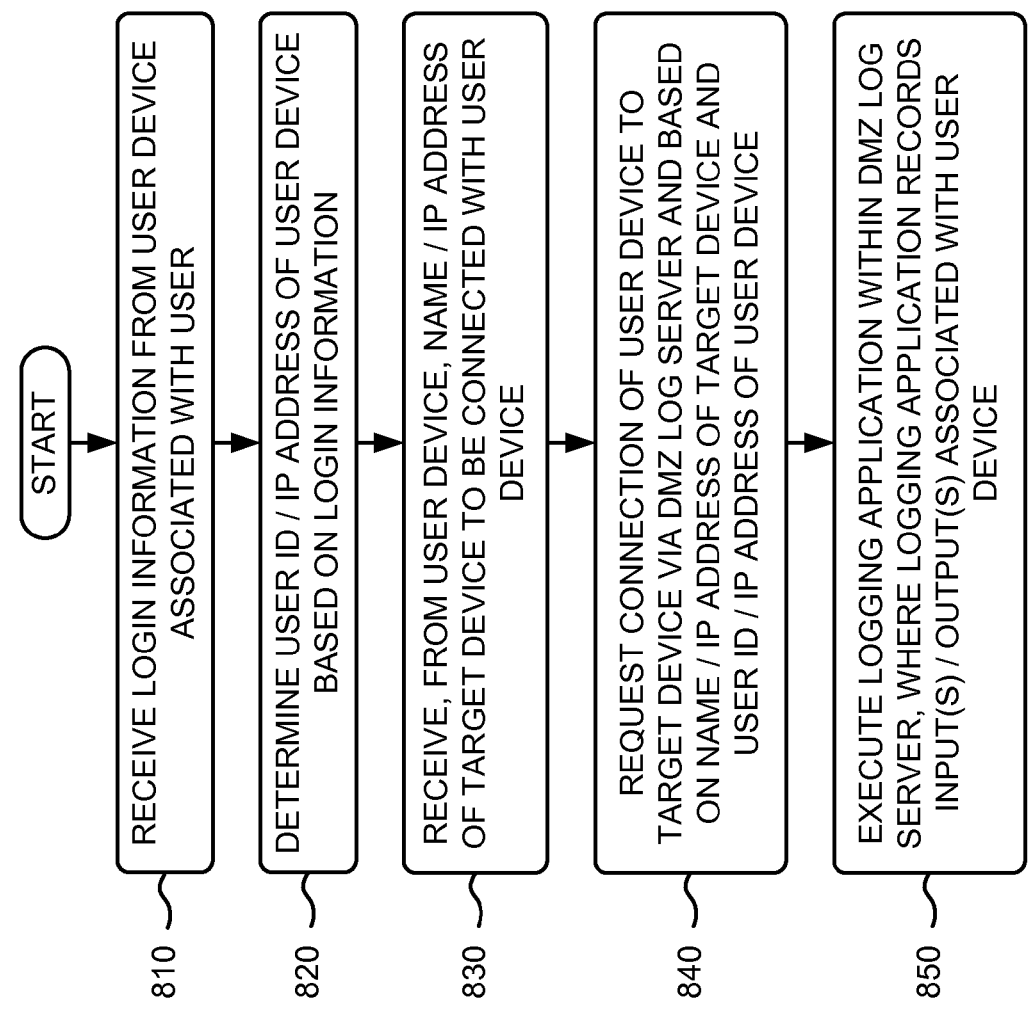

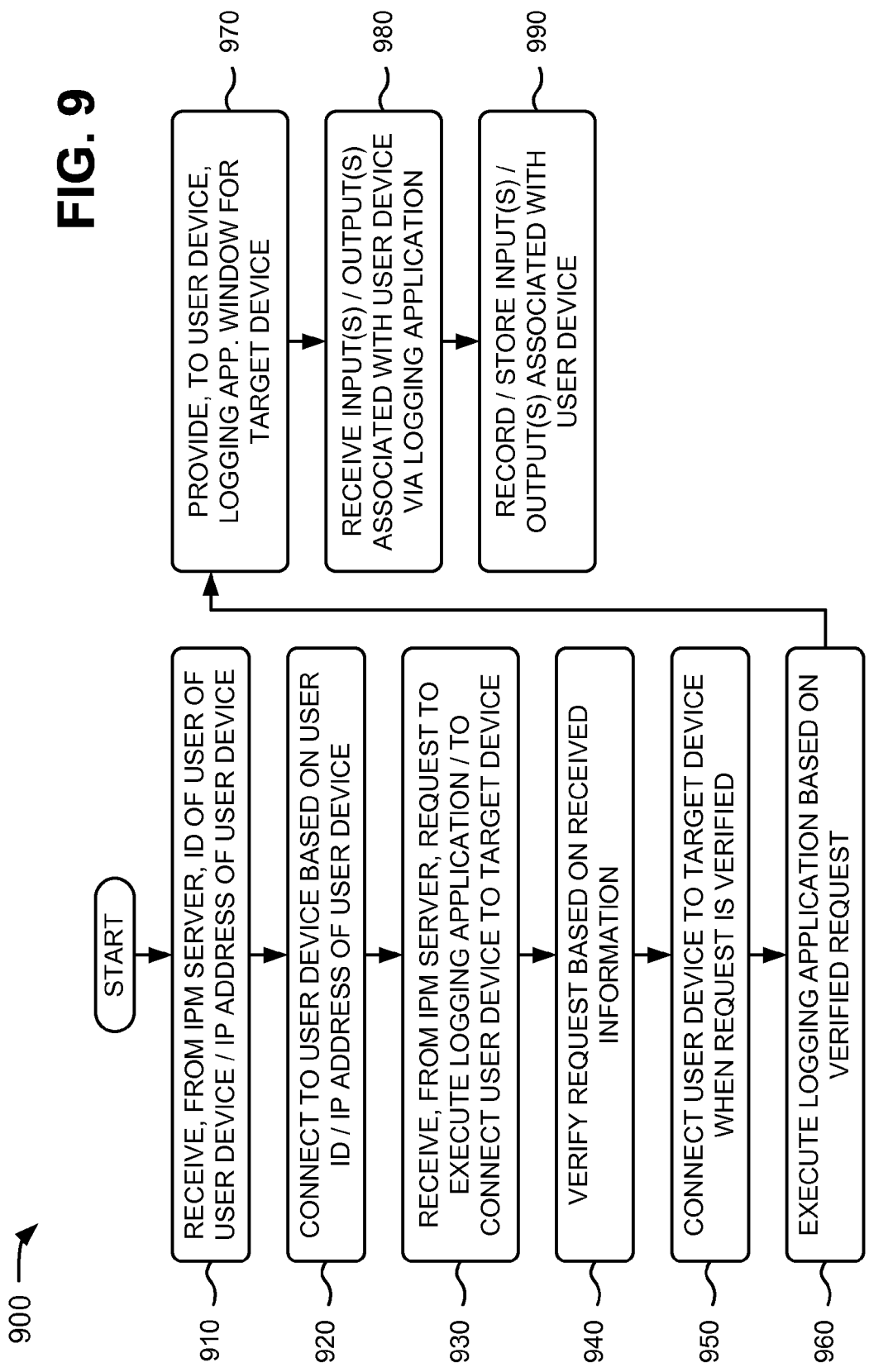

KEYSTROKE LOGGER FOR UNIX-BASED SYSTEMS

BACKGROUND

A Unix shell is a command-line interpreter and script host that provides a traditional user interface for the Unix operating system and for Unix-like systems. Users direct operation of a Unix-based device by entering commands (e.g., input as text) for the Unix shell to execute or by creating text scripts of one or more such commands. Some users may securely access Unix-based devices (e.g., secure servers) via a user device (e.g., a personal computer, a laptop computer, a personal digital assistant (PDA), etc.), and may manipulate the Unix-based devices. For example, a network administrator of a telecommunications network may securely access one or more Unix-based devices in the network, and may manipulate (e.g., repair, perform maintenance on, edit configuration files, edit databases, etc.) the Unix-based devices.

However, current systems do not record users' manipulation of Unix-based devices. For example, current systems do not record configuration file changes and/or database edits performed by users, passwords provided by users to access Unix-based devices, applications, databases, etc. In another example, current systems do not provide a command line shell history when a user enters substitute user Unix commands (e.g., "su SomeID" or "sesudo BSomeID") that are used to run a shell of another user without logging out.

BRIEF DESCRIPTION OF THE DRAWINGS

FIG. 6 illustrates a diagram of an exemplary portion of an exemplary database capable of being provided in and/or maintained by the database server of FIG. 1;

FIG. 7 depicts a diagram of an exemplary portion of exemplary log files capable of being recorded by the DMZ log server and/or stored in the database server of FIG. 1;

FIG. 8 illustrates a flow chart of an exemplary process for securely executing a keystroke logging application according to implementations described herein; and FIGS. 9 and 10 depict flow charts of an exemplary process for recording and/or storing one or more inputs and/or outputs provided by the user device according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide systems and/or methods that may record and/or store information input and/or output by a user device accessing one or more Unix-based devices. For example, in one implementation, the systems and/or methods may receive login information from a user device associated with a user, and may determine a user identification (ID) and an Internet protocol (IP) address of the user device based on the login information. The systems and/or methods may receive, from the user device, a name and an IP address of a target device to be connected with the user device, and may request connection of the user device to the target device, via a DMZ log server and based on the name and IP address of the target device, the user ID, and/or the IP address of the user device. The systems and/or methods may execute a logging application within the DMZ log server, where the logging application may record one or more inputs and/or outputs associated with the user device.

The systems and/or methods described herein may address the lack of a command line shell history when a user enters substitute user Unix commands (e.g., "su SomeID" or "sesudo BSomeID") by recording inputs and/or outputs associated with the user device (e.g., provided at a Unix command line, text typed in to user device, text that is cut and pasted via the user device, etc.). By recording inputs and/or outputs associated with the user device, the systems and/or methods may also record configuration file changes, database edits, etc. performed by a user of the user device, passwords provided by the user to access Unix-based devices, applications, databases, etc. The systems and/or methods may simplify firewall configurations and security management of multiple user devices by providing a single point of connectivity for access to Unix-based systems.

As used herein, the term "user" is intended to be broadly interpreted to include a user device or a user (e.g., a network administration, a network operator, etc.) of a user device and/or a reporting device.

Figure 1:
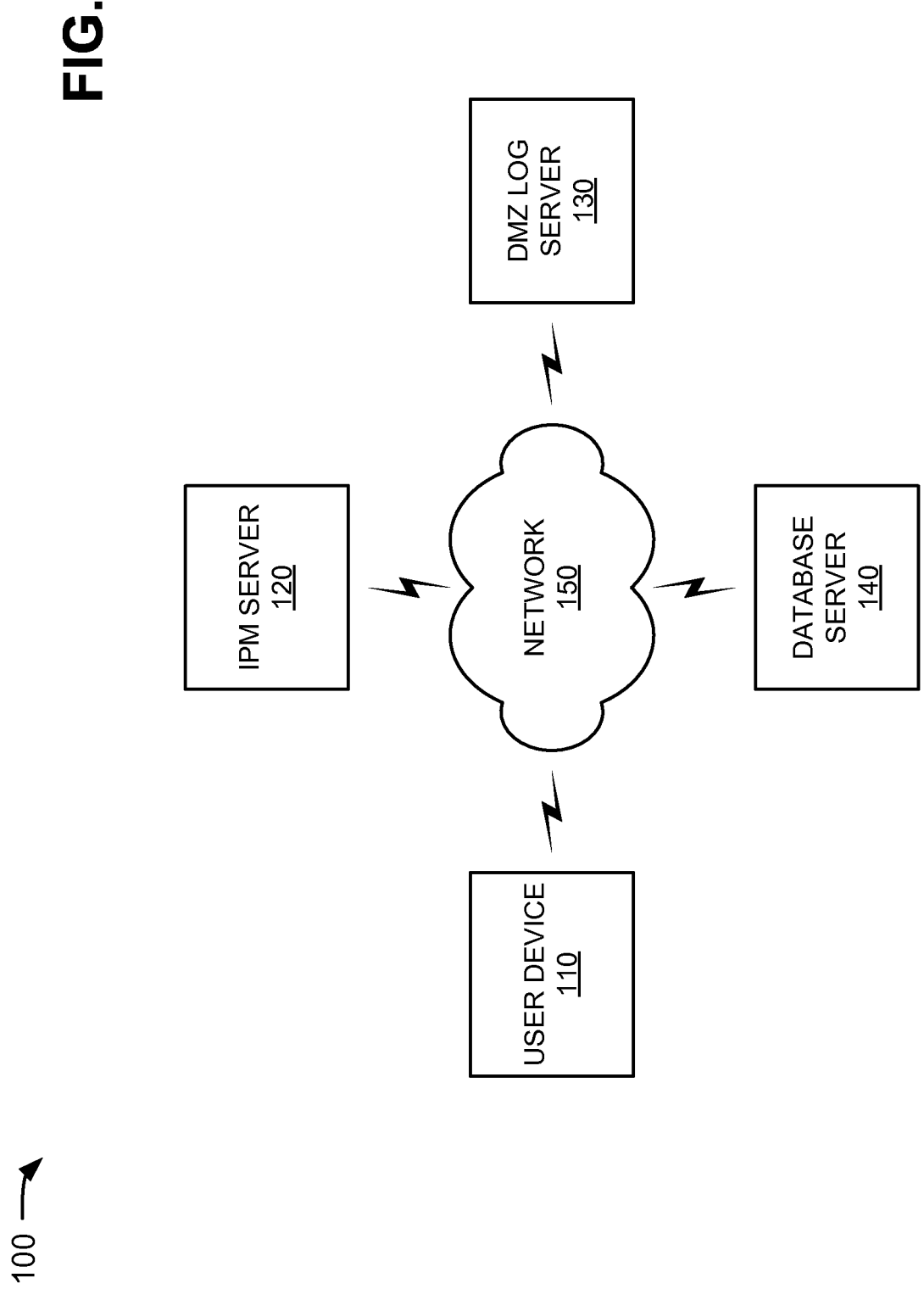
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include a user device 110, an Internet program manager (IPM) server 120, a demilitarized (DMZ) log server 130, and a database server 140 interconnected by a network 150. Components of network 100 may interconnect via wired and/or wireless connections. A single user device 110, IPM server 120, DMZ log server 130, database server 140, and network 150 have been illustrated in FIG. 1 for simplicity. In practice, there may be more user devices 110, IPM servers 120, DMZ log servers 130, database servers 140, and/or networks 150. Also, in some instances, one or more of the components of network 100 may perform one or more functions described as being performed by another one or more of the components of network 100.

User device 110 may include any device that is capable of accessing IPM server 120, DMZ log server 130, and/or a target device (e.g., a Unix-based device, not shown) via network 150. For example, user device 110 may include a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a laptop computer, a personal computer, or other types of computation or communication devices. In one exemplary implementation, user device 110 may securely access a target device (e.g., a Unix-based device) via interactions with IPM server 120 and DMZ log server 130, and DMZ log server 130 may record one or more inputs and/or outputs associated with user device 110. In one example, user device 110 may include an application (e.g., an Attachmate KEA! X application provided by Attachmate Corporation) that enables user device 110 to provide a secure, multi-threaded file transfer protocol (FTP) client for desktop-to-host and third party or host-to-host file transfer, secure shell (SSH) encrypted host access functions (e.g., port forwarding, agent forwarding for protecting authentication keys for roaming users, etc.), etc.

IPM server 120 may include one or more server devices, or other types of computation or communication devices, that gather, process, search, and/or provide information in a manner described herein. IPM server 120 may provide user device 110 with secure access (e.g., via hypertext transfer protocol secure (HTTPS)) to a target device (e.g., a Unix-based device) via DMZ log server 130. In one exemplary implementation, IPM server 120 may receive login information from user device 110 associated with a user, and may determine a user ID and an IP address of user device 110 based on the login information. IPM server 120 may receive, from user device 110, a name and an IP address of a target device (e.g., a Unix-based device) to be connected with user device 110, and may request connection of user device 110 to the target device, via DMZ log server 130 and based on the name and IP address of the target device, the user ID, and/or the IP address of user device 110. IPM server 120 may execute a logging application (e.g., an application that provides a SSH window for the target device) within DMZ log server 130, where the logging application may record one or more inputs and/or outputs associated with user device 110. Further details of IPM server 120 are provided below in connection with, for example, FIG. 4.

DMZ log server 130 may include one or more server devices, or other types of computation or communication devices, that gather, process, search, and/or provide information in a manner described herein. DMZ log server 130 may expose secure target devices (e.g., Unix-based devices) to a larger, untrusted network (e.g., the Internet). DMZ log server 130 may add an additional layer of security to the target devices, and may prevent access to the target devices. In one exemplary implementation, DMZ log server 130 may receive, from IPM server 120, an ID of a user of user device 110 and an IP address of user device 110, and may connect to user device 110 based on the user ID and the IP address of user device 110. DMZ log server 130 may receive, from IPM server 120, a request to execute a logging application and to connect user device 110 to a target device (e.g., a secure Unix-based device), may verify the request based on the received information, and may connect user device 110 to the target device when the request is verified. DMZ log server 130 may execute the logging application based on the verified request, and may provide, to user device 110, a logging application window for the target device. DMZ log server 130 may receive, via the logging application, one or more inputs and/or outputs provided by user device 110, and may record and/or store the one or more inputs/outputs provided by user device 110. Further details of DMZ log server 130 are provided below in connection with, for example, FIG. 5.

Database server 140 may include one or more server devices, or other types of computation or communication devices, that gather, process, search, and/or provide information in a manner described herein. Database server 140 may include one or more storage devices that may store the one or more inputs/outputs provided by user device 110 and recorded by DMZ log server 130. In one example, database server 140 may store information described below in connection with FIG. 6 (e.g., passwords provided via user device 110, typed text provided via user device 110, cut-and-paste text provided via user device 110, etc.). Although FIG. 1 shows database server 140 as separate from DMZ log server 130, in other implementations, database server 140 may be incorporated in DMZ log server 130.

Network 150 may include one or more networks of any type. For example, network 150 may include a local area network (LAN), a wide area network (WAN), a metropolitan area network (MAN), a telephone network, such as the Public Switched Telephone Network (PSTN) or Public Land Mobile Network (PLMN), an intranet, the Internet, an optical fiber (or fiber optic)-based network, or a combination of networks.

Although FIG. 1 shows exemplary components of network 100, in other implementations, network 100 may contain fewer, different, differently arranged, or additional components than depicted in FIG. 1. For example, one or more target devices (e.g., Unix-based devices) may be provided in network and may be securely accessed by user device 110 (e.g., via IMP server 120 and DMZ log server 130). The target devices may include access control rules (e.g., a host based access control utility (such as, security for open systems (SeOS)) which may run on Unix and may provide control to files and resources on an operating system based on access rules) that permit a user (e.g., of user device 110) to access the target devices via DMZ log server 130, and prohibit the user from executing FTP, secure FTP, etc. In another example, if more than one DMZ log server 130 is provided, network 100 may include a load balancer that may direct user device 110 to one of the multiple DMZ log servers based on load conditions associated with the multiple DMZ log servers.

Figure 2:
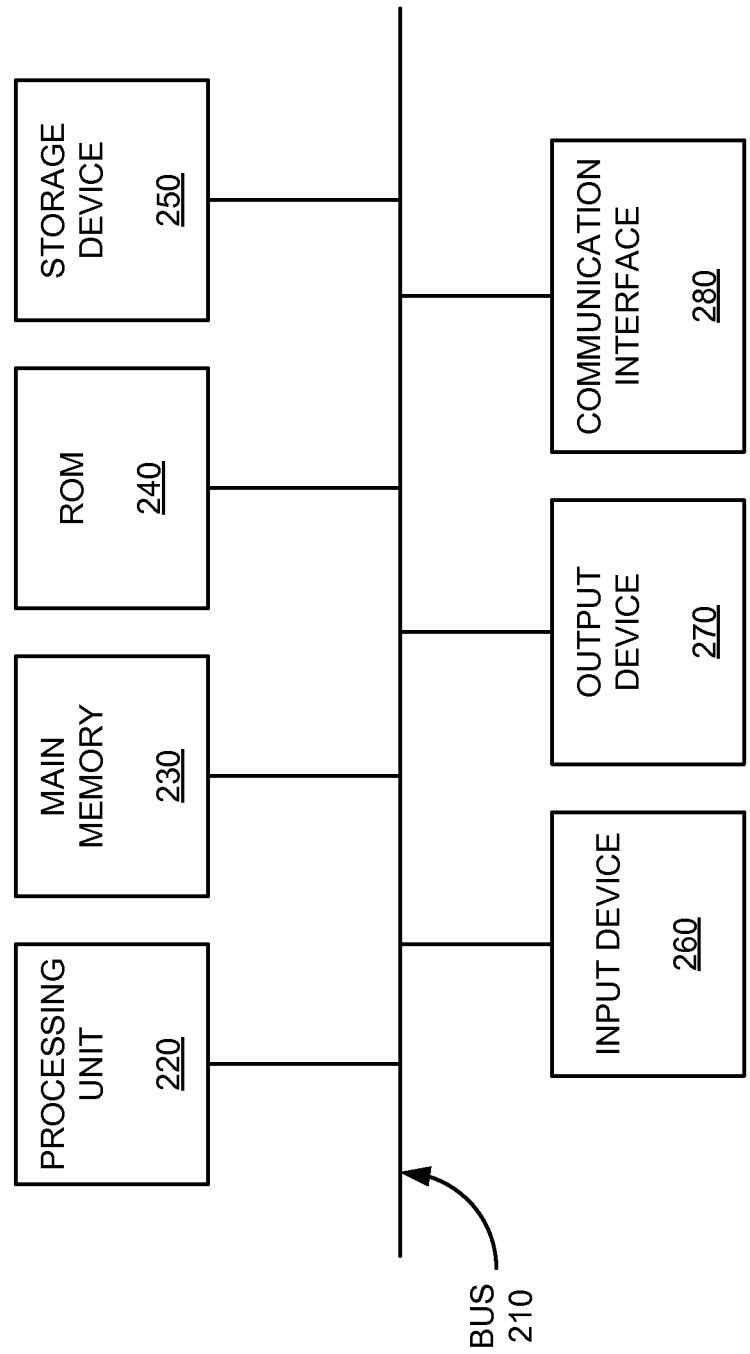
FIG. 2 illustrates a diagram of exemplary components of a user device, an Internet program manager (IPM) server, a demilitarized zone (DMZ) log server, and/or a database server of the network depicted in FIG. 1.

FIG. 2 is an exemplary diagram of a device 200 that may correspond to user device 110, IPM server 120, DMZ log server 130, and/or database server 140. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include one or more random access memories (RAMs) or other types of dynamic storage devices that may store information and instructions for execution by processing unit 220. ROM 240 may include one or more ROM devices or other types of static storage devices that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 150.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
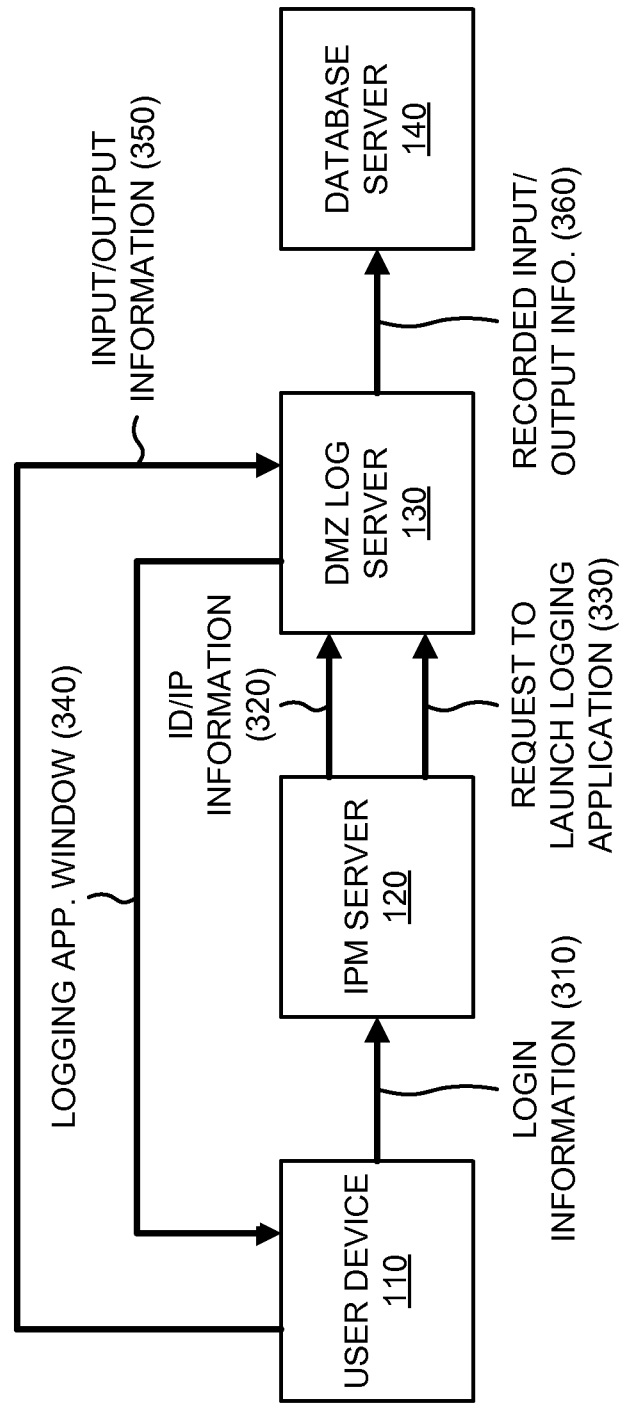
FIG. 3 depicts a diagram of exemplary interactions among components of an exemplary portion of the network illustrated in FIG. 1.

FIG. 3 depicts a diagram of exemplary interactions among components of an exemplary portion 300 of network 100. As illustrated, exemplary network portion 300 may include user device 110, IPM server 120, DMZ log server 130, and database server 140. User device 110, IPM server 120, DMZ log server 130, and database server 140 may include the features described above in connection with, for example, FIG. 1.

As further shown in FIG. 3, user device 110 may provide login information 310 to IPM server 120 (e.g., in order to login to IPM server 120). Login information 310 may include a user ID (e.g., a numeric, alphanumeric, etc. identifier) associated with a user of user device 110, a password associated with the user, an IP address associated with user device 110, a request to execute a logging application, etc. IPM server 120 may receive login information 310 from user device 110, may determine a user ID and an IP address of user device 110, as indicated by reference number 320, based on login information 310, and may provide ID/IP information 320 to DMZ log server 130. IPM server 120 may receive, from user device 110, a name and an IP address of a target device (e.g., a Unix-based device) to be connected with user device 110, and may request connection of user device 110 to the target device via DMZ log server 130 and based on the name and IP address of the target device, the user ID, and/or the IP address of user device 110. As further shown in FIG. 3, IPM server 120 may provide, to DMZ log server 130, a request 330 to launch a logging application (e.g., an application that provides a SSH window for the target device).

DMZ log server 130 may receive ID/IP information 320 from IPM server 120, and may connect to user device 110 based on the user ID and the IP address of user device 110. DMZ log server 130 may receive request 330 from IPM server 120, may verify request 330 based on the received information (e.g., ID/IP information 320, the name and IP address of the target device, etc.), and may connect user device 110 to the target device when request 330 is verified. If request 330 is verified, DMZ log server 130 may execute the logging application, and may provide, to user device 110, a logging application window 340 (e.g., a SSH window) for the target device. DMZ log server 130 may receive, via the logging application and from user device 110, input/output information 350 associated with user device 110. Input/output information 350 may include text input by a user via user device 110, text a user cuts (or copies) and pastes via user device 110, configuration file changes made via user device 110, database changes made via user device 110, passwords used by user device 110 to access Unix systems, applications, databases, etc. DMZ log server 130 may record some or all of input/output information 350, and may provide recorded input/output information 360 (e.g., recorded as log files) to database server 140 for storage.

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

Figure 4:
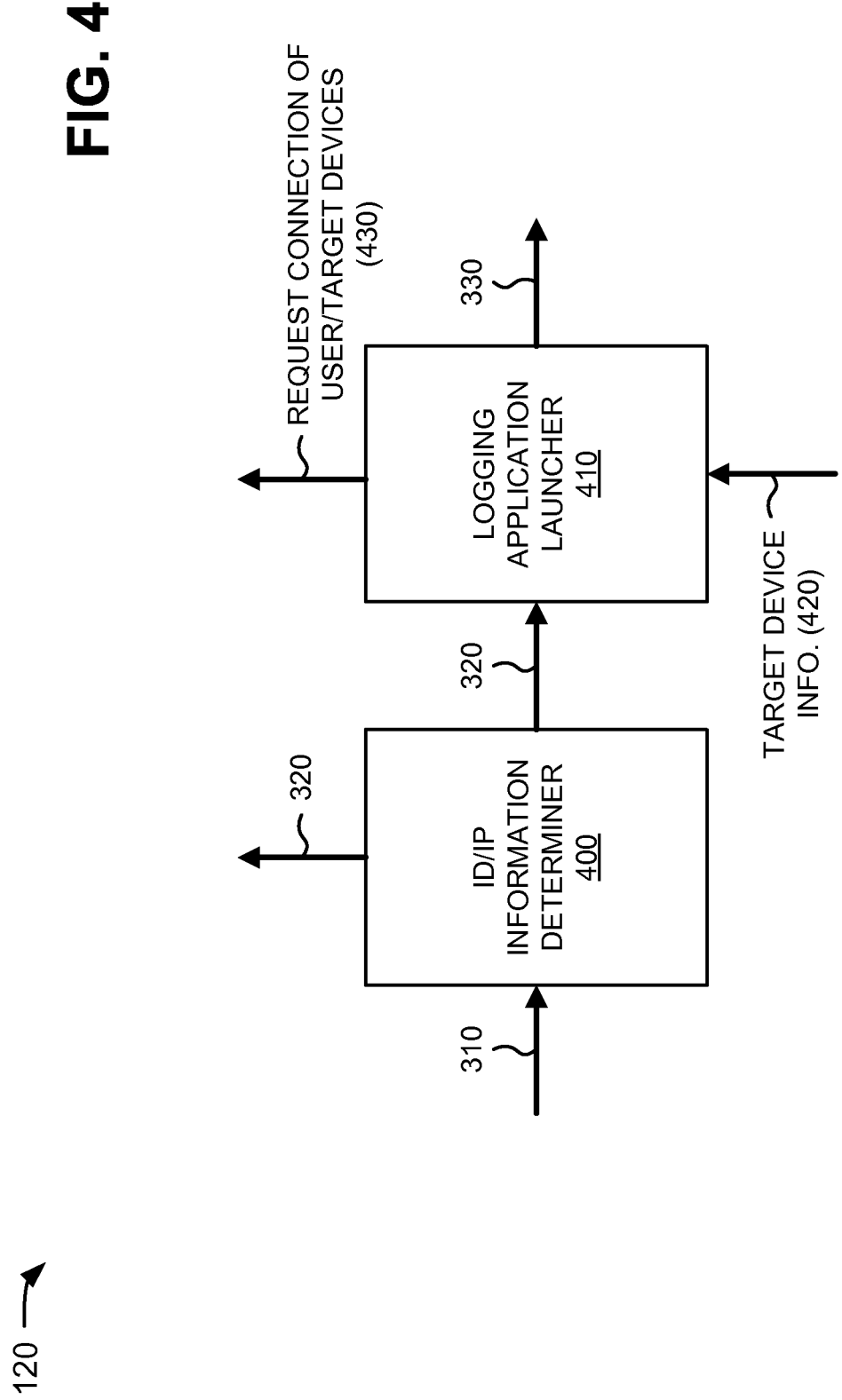
FIG. 4 illustrates a diagram of exemplary functional components of the IPM server depicted in FIG. 1.

FIG. 4 illustrates a diagram of exemplary functional components of IPM server 120. In one implementation, the functions described in connection with FIG. 4 may be performed by one or more components of device 200 (FIG. 2). As shown in FIG. 4, IPM server 120 may include an ID/IP information determiner 400 and a logging application launcher 410.

ID/IP information determiner 400 may include hardware or a combination of hardware and software that may receive login information 310 from user device 110; may determine a user ID and an IP address of user device 110, as indicated by reference number 320, based on login information 310; and may provide ID/IP information 320 to DMZ log server 130. As further shown in FIG. 4, ID/IP information determiner 400 may provide ID/IP information 320 to logging application launcher 410.

Logging application launcher 410 may include hardware or a combination of hardware and software that may receive ID/IP information 320 from ID/IP information determiner 400, and may receive target device information 420 from user device 110. Target device information 420 may include a name and an IP address of a target device (e.g., a Unix-based device) to be connected with user device 110. Logging application launcher 410 may request, as indicated by reference number 430, connection of user device 110 to the target device, via DMZ log server 130 (e.g., if DMZ log server 130 approves connection) and based on ID/IP information 320 and target device information 420. As further shown in FIG. 4, logging application launcher 410 may provide, to DMZ log server 130, request 330 to launch a logging application (e.g., an application that provides a SSH window for the target device).

Although FIG. 4 shows exemplary functional components of IPM server 120, in other implementations, IPM server 120 may contain fewer, different, differently arranged, or additional functional components than depicted in FIG. 4. In still other implementations, one or more functional components of IPM server 120 may perform one or more other tasks described as being performed by one or more other functional components of IPM server 120.

Figure 5:
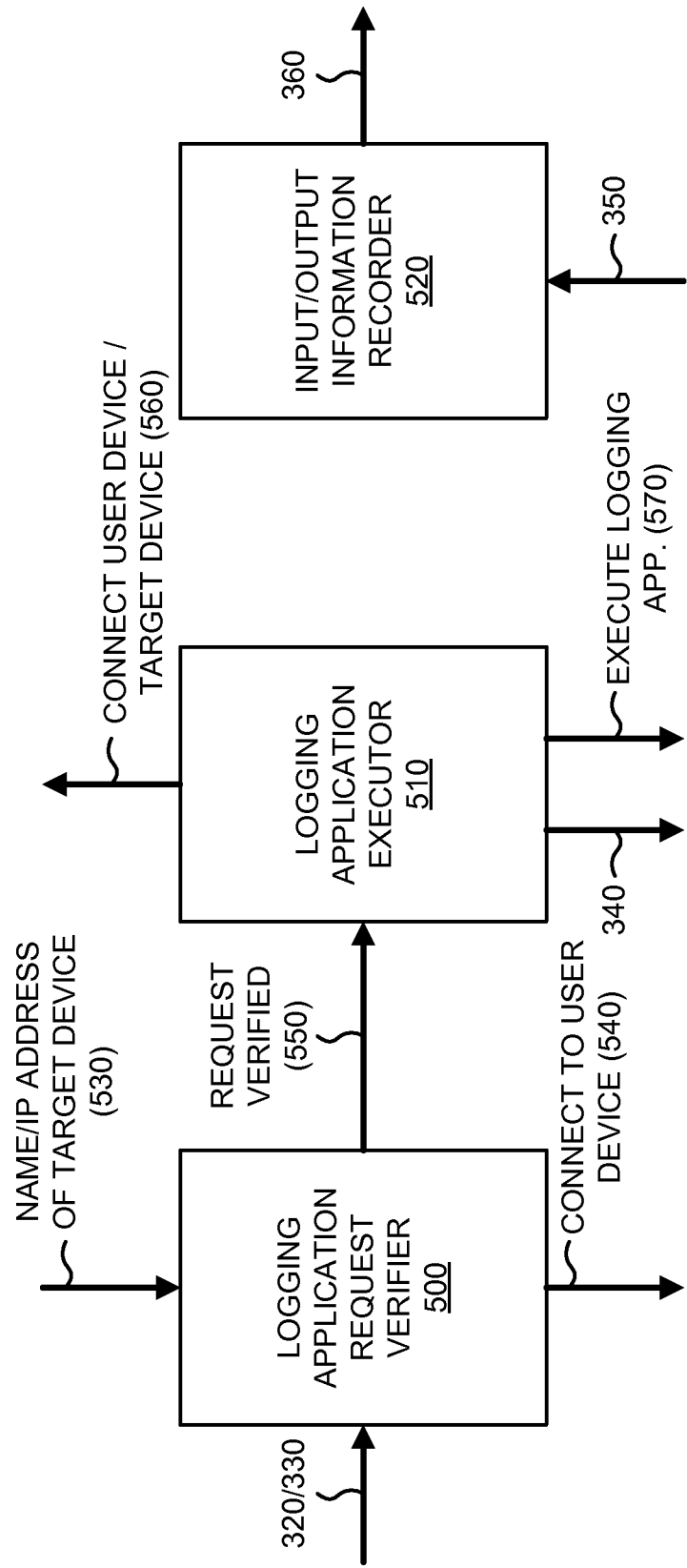
FIG. 5 depicts a diagram of exemplary functional components of the DMZ log server illustrated in FIG. 1.

FIG. 5 depicts a diagram of exemplary functional components of DMZ log server 130. In one implementation, the functions described in connection with FIG. 5 may be performed by one or more components of device 200 (FIG. 2). As shown in FIG. 5, DMZ log server 130 may include a logging application request verifier 500, a logging application executor 510, and an input/output information recorder 520.

Logging application request verifier 500 may include hardware or a combination of hardware and software that may receive ID/IP information 320, request 330, and the name and IP address of the target device (e.g., as indicated by reference number 530) from IPM server 120, and may connect to user device 110 based on the user ID and the IP address of user device 110 (e.g., provided via ID/IP information 320), as indicated by reference number 540. Logging application request verifier 500 may verify request 330 based on the received information (e.g., ID/IP information 320, name/IP address 530 of the target device, etc.). In one example, to verify request 330, logging application request verifier 500 may verify that the user ID is valid, that the IP address of the target device is valid (e.g., can be pinged), that the IP address of user device 110 is valid (e.g., can be pinged), that user device 110 is permitted to connect to the target device, etc. Logging application request verifier 500 may provide an indication 550 that request 330 is verified to logging application executor 510.

Logging application executor 510 may include hardware or a combination of hardware and software that may receive indication 550 from logging application request verifier 500, and may connect user device 110 to the target device when request 330 is verified, as indicated by reference number 560. If request 330 is verified, logging application executor 510 may execute the logging application, as indicated by reference number 570, and may provide logging application window 340 to user device 110.

Input/output information recorder 520 may include hardware or a combination of hardware and software that may receive, via the logging application and from user device 110, input/output information 350 associated with user device 110. Input/output information recorder 520 may record some or all of input/output information 350, and may provide recorded input/output information 360 (e.g., recorded as log files) to database server 140 for storage.

Although FIG. 5 shows exemplary functional components of DMZ log server 130, in other implementations, DMZ log server 130 may contain fewer, different, differently arranged, or additional functional components than depicted in FIG. 5. In still other implementations, one or more functional components of DMZ log server 130 may perform one or more other tasks described as being performed by one or more other functional components of DMZ log server 130.

FIG. 6 illustrates a diagram of an exemplary portion 600 of an exemplary database capable of being provided in and/or maintained by database server 140. As shown, database portion 600 may include a variety of input/output information associated with user devices (e.g., user device 110). For example, database portion 600 may include a passwords field 610, a typed text field 620, a cut/paste text field 630, an other inputs/outputs field 640, and/or a variety of entries 650 associated with fields 610-640.

Passwords field 610 may include information associated with passwords entered by users of user devices (e.g., user device 110). For example, passwords field 610 may include entries for "PASSWORD1," "PASSWORD2," "PASSWORD3," etc. In one example, each entry in passwords field 610 may include a numeric password, an alphabetical password, and/or an alphanumeric password.

Typed text field 620 may include information associated with text typed by users of user devices (e.g., user device 110). For example, typed text field 620 may include configuration file changes entered by a user of user device 110, database changes provided by a user of user device 110, etc. As shown in FIG. 6, typed text field 620 may include, for example, entries for "AAA," "BBB," "CCC," etc.

Cut/paste text field 630 may include information associated with text cut (or copied) and pasted by users of user devices (e.g., user device 110). For example, if a user of user device 110 cuts (or copies) and pastes the phrase "server maintenance required," cut/paste text field 630 may include an entry for such a phrase. As shown in FIG. 6, cut/paste text field 630 may include, for example, entries for "The defective server . . . ," "The network element . . . ," "The protocol . . . ," etc.

Other inputs/outputs field 640 may include information associated with any other inputs and/or outputs provided by user device 110 when user device 110 is connected to a target device via DMZ log sever 130. For example, other inputs/outputs field 640 may include entries for input/output information provided in connection with substitute user Unix commands (e.g., "su SomeID" or "sesudo BSomeID").

Although FIG. 6 shows exemplary information that may be provided in database portion 600, in other implementations, database portion 600 may contain fewer, different, differently arranged, or additional information than depicted in FIG. 6.

FIG. 7 depicts a diagram of an exemplary portion 700 of exemplary log files capable of being recorded by DMZ log server 130 and/or stored in database server 140. As shown, exemplary log files portion 700 may include a connection information section 710 and an input/output information section 720.

Connection information section 710 may include information associated with connection of a user device (e.g., user device 110) to a target device via DMZ log server 130. For example, connection information section 710 may include a password associated with user device 110, whether user device 110 is authenticated, when user device 110 last logged into the target device, etc.

Input/output information section 720 may include information associated with inputs and/or outputs provided by user device 110 when user device 110 is connected to a target device via DMZ log sever 130. For example, as shown in FIG. 7, input/output information section 720 may indicate that user device 110 entered text, such as "0x0064, 1:'d' 7bit," "0x0061, 1:'a' 7bit," "0x0074, 1:'t' 7bit," "0x0065, 1:'e' 7bit," etc.

FIG. 8 illustrates a flow chart of an exemplary process 800 for securely executing a keystroke logging application according to implementations described herein. In one implementation, process 800 may be performed by IPM server 120. In another implementation, some or all of process 800 may be performed by another device or group of devices, including or excluding IPM server 120.

As illustrated in FIG. 8, process 800 may include receiving login information from a user device associated with a user (block 810), and determining a user ID and an IP address of the user device based on the login information (block 820). For example, in implementations described above in connection with FIG. 3, user device 110 may provide login information 310 to IPM server 120 (e.g., in order to login to IPM server 120). Login information 310 may include a user ID (e.g., a numeric, alphanumeric, etc. identifier) associated with a user of user device 110, a password associated with the user, an IP address associated with user device 110, a request to execute a logging application, etc. IPM server 120 may receive login information 310 from user device 110, may determine a user ID and an IP address of user device 110, as indicated by reference number 320, based on login information 310.

As further shown in FIG. 8, a name and an IP address of a target device to be connected with the user device may be received from the user device (block 830), and a connection of the user device to the target device may be requested via a DMZ log server and based on the name and IP address of the target device, the user ID, and the IP address of the user device (block 840). For example, in implementations described above in connection with FIG. 3, IPM server 120 may receive, from user device 110, a name and an IP address of a target device (e.g., a Unix-based device) to be connected with user device 110, and may request connection of user device 110 to the target device via DMZ log server 130 and based on the name and IP address of the target device, the user ID, and/or the IP address of user device 110.

Returning to FIG. 8, a logging application may be executed within the DMZ log server, where the logging application may record one or more inputs and/or outputs associated with the user device (block 850). For example, in implementations described above in connection with FIG. 3, IPM server 120 may provide, to DMZ log server 130, request 330 to launch a logging application (e.g., an application that provides a SSH window for the target device). DMZ log server 130 may receive request 330 from IPM server 120, may verify request 330 based on the received information (e.g., ID/IP information 320, the name and IP address of the target device, etc.), and may connect user device 110 to the target device when request 330 is verified. If request 330 is verified, DMZ log server 130 may execute the logging application, and may receive, via the logging application and from user device 110, input/output information 350 associated with user device 110. Input/output information 350 may include text input by a user via user device 110, text a user cuts (or copies) and pastes via user device 110, configuration file changes made via user device 110, database changes made via user device 110, passwords used by user device 110 to access Unix systems, applications, databases, etc. DMZ log server 130 may record some or all of input/output information 350.

Figure 10:
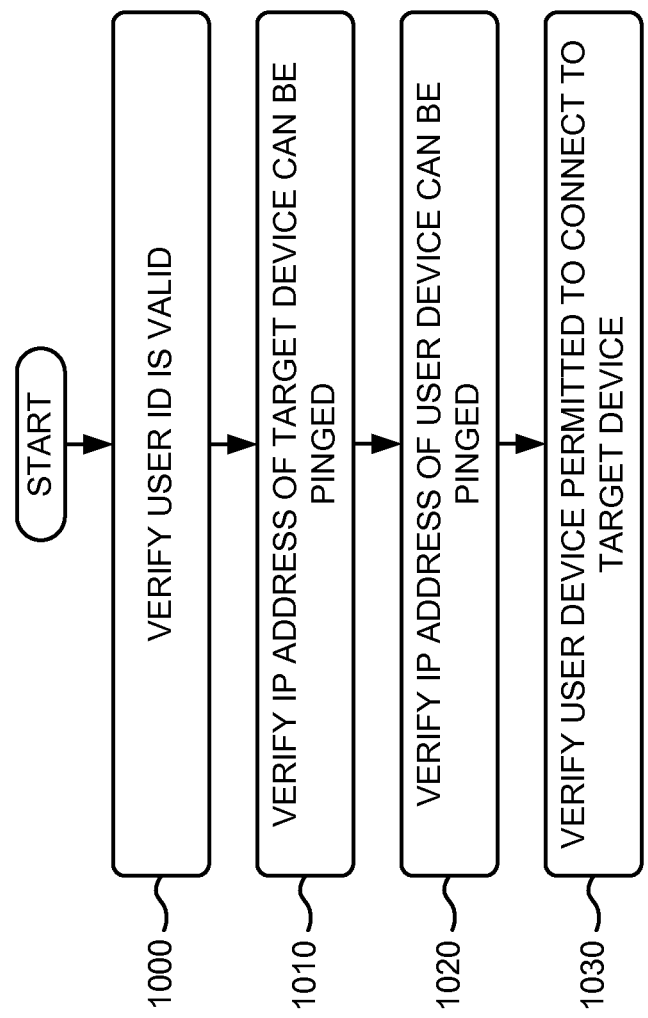

FIGS. 9 and 10 depict flow charts of an exemplary process 900 for recording and/or storing one or more inputs and/or outputs provided by the user device according to implementations described herein. In one implementation, process 900 may be performed by DMZ log server 130. In another implementation, some or all of process 900 may be performed by another device or group of devices, including or excluding DMZ log server 130.

As illustrated in FIG. 9, process 900 may include receiving, from an IPM server, an ID of a user of a user device and an IP address of the user device (block 910), connecting to the user device based on the user ID and the IP address of the user device (block 920), and receiving, from the IPM server, a request to execute a logging application and to connect the user device to a target device (block 930). For example, in implementations described above in connection with FIG. 5, logging application request verifier 500 of DMZ log server 130 may receive ID/IP information 320, request 330, and the name and IP address of the target device (e.g., as indicated by reference number 530) from IPM server 120, and may connect to user device 110 based on the user ID and the IP address of user device 110 (e.g., provided via ID/IP information 320), as indicated by reference number 540.

As further shown in FIG. 9, the request to execute the logging application and to connect the user device to the target device may be verified (block 940), the user device may be connected to the target device when the request is verified (block 950), and the logging application may be executed based on the verified request (block 960). For example, in implementations described above in connection with FIG. 5, logging application request verifier 500 may verify request 330 based on the received information (e.g., ID/IP information 320, name/IP address 530 of the target device, etc.). Logging application request verifier 500 may provide indication 550 that request 330 is verified to logging application executor 510 of DMZ log server 130. Logging application executor 510 may receive indication 550 from logging application request verifier 500, and may connect user device 110 to the target device when request 330 is verified, as indicated by reference number 560. If request 330 is verified, logging application executor 510 may execute the logging application, as indicated by reference number 570.

Returning to FIG. 9, a logging application window for the target device may be provided to the user device (block 970), one or more inputs and/or outputs associated with the user device may be received via the logging application (block 980), and the one or more inputs/outputs associated with the user device may be recorded and/or stored (block 990). For example, in implementations described above in connection with FIG. 5, if request 330 is verified, logging application executor 510 may provide logging application window 340 to user device 110. Input/output information recorder 520 of DMZ log sever 130 may receive, via the logging application and from user device 110, input/output information 350 associated with user device 110. Input/output information recorder 520 may record some or all of input/output information 350, and may provide recorded input/output information 360 (e.g., recorded as log files) to database server 140 for storage.

Process block 940 may include the process blocks depicted in FIG. 10. As shown in FIG. 10, process block 940 may include verifying that the user ID is valid (block 1000), verifying that the IP address of the target device can be pinged (block 1010), verifying that the IP address of the user device can be pinged (block 1020), and/or verifying that the user device is permitted to connect to the target device (block 1030). For example, in implementations described above in connection with FIG. 5, to verify request 330, logging application request verifier 500 of DMZ log sever 130 may verify that the user ID is valid, that the IP address of the target device is valid (e.g., can be pinged), that the IP address of user device 110 is valid (e.g., can be pinged), that user device 110 is permitted to connect to the target device, etc.

Implementations described herein may provide systems and/or methods that may record and/or store information input and/or output by a user device accessing one or more Unix-based devices. For example, in one implementation, the systems and/or methods may receive login information from a user device associated with a user, and may determine a user ID and an IP address of the user device based on the login information. The systems and/or methods may receive, from the user device, a name and an IP address of a target device to be connected with the user device, and may request connection of the user device to the target device, via a DMZ log server and based on the name and IP address of the target device, the user ID, and/or the IP address of the user device. The systems and/or methods may execute a logging application within the DMZ log server, where the logging application may record one or more inputs and/or outputs associated with the user device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, from an Internet program manager (IPM) server and by a demilitarized (DMZ) log server, a user identification (ID) of a user associated with a user device and an Internet protocol (IP) address of the user device;
    connecting the computing device to the user device based on the user ID and the IP address of the user device;
    receiving, from the IPM server and by the DMZ log server, a request to execute a logging application that records one or more inputs or one or more outputs associated with the user device;
    executing, by the DMZ log server, the logging application based on the request, an IP address of a target device, the user ID, and the IP address of the user device;
    receiving, by the DMZ log server and via the logging application, the one or more inputs or the one or more outputs; and
    recording, by the DMZ log server, the one or more inputs or the one or more outputs.

2. The method of claim 1, where the request to execute the logging application includes a request to connect the user device to the target device, and where executing the logging application comprises:
    verifying the request to execute the logging application based on the user ID, the IP address of the user device, and the IP address of the target device;
    connecting the user device to the target device after the verifying of the request to execute the logging application; and
    executing the logging application after the verifying of the request to execute the logging application.

3. The method of claim 1, where receiving the one or more inputs or the one or more outputs comprises:
    providing, to the user device, a logging application window, associated with the logging application, for the target device; and
    receiving the one or more inputs or the one or more outputs via the logging application window.

4. The method of claim 2, where verifying the request to execute the logging application comprises one or more of:
    verifying that the user ID is valid;
    verifying that the IP address of the target device is valid;
    verifying that the IP address of the user device is valid; or
    verifying that the user device is permitted to connect to the target device.

5. The method of claim 2, where the target device comprises a UNIX based device.

6. The method of claim 1, where the one or more inputs or the one or more outputs include at least one of:
    text input by the user via the user device,
    text the user cuts and pastes via the user device,
    text the user copies and pastes via the user device,
    a configuration file change made via the user device,
    a database change made via the user device, or
    a password used by the user device.

7. A method comprising:
    receiving, by a computing device, login information from a user device associated with a user;
    determining, by the computing device, a user identification (ID) of the user and an Internet protocol (IP) address of the user device based on the login information;
    receiving, by the computing device and from the user device, a name and an IP address of a target device to be connected to the user device;
    requesting, by the computing device, connection of the user device to the target device via a demilitarized (DMZ) log server and based on the name of the target device, the IP address of the target device, the user ID, and the IP address of the user device; and
    causing, by the computing device, execution of a logging application within the DMZ log server,
    the logging application recording one or more inputs or one or more outputs associated with the user device.

8. The method of claim 7, where the computing device comprises an Internet program manager (IPM) server.

9. The method of claim 7, where the target device comprises a UNIX based device.

10. The method of claim 7, where the one or more inputs or the one or more outputs include at least one of:
    text input by the user via the user device,
    text the user cuts and pastes via the user device,
    text the user copies and pastes via the user device,
    a configuration file change made via the user device,
    a database change made via the user device, or
    a password used by the user device.

11. A system comprising:
    a demilitarized (DMZ) log server to:
    receive, from an Internet program manager (IPM) server, an identification (ID) of a user associated with a user device and an Internet protocol (IP) address of the user device,
    connect the device to the user device based on the user ID and the IP address of the user device,
    receive, from the IPM server, a request to execute a logging application that records one or more inputs or one or more outputs associated with the user device and to connect the user device to a target device,
    connect the user device to the target device based on the request, an IP address of the target device, the user ID, and the IP address of the user device,
    execute the logging application based on the request,
    receive, via the logging application, the one or more inputs or the one or more outputs, and
    record the one or more inputs or the one or more outputs.

12. The system of claim 11, where, when connecting the user device to the target device, the DMZ log server is to:
    verify the request based on at least one of the user ID, the IP address of the user device, and the IP address of the target device, and connect the user device to the target device after the verifying of the request.

13. The system of claim 12, where, when verifying the request, the DMZ log server is to one or more of:
    verify that the user ID is valid,
    verify that the IP address of the target device is valid,
    verify that the IP address of the user device is valid, or
    verify that the user device is permitted to connect to the target device.

14. The system of claim 11, where, when receiving the one or more inputs or one or more outputs, the DMZ log server is to:

provide, to the user device, a logging application window, associated with the logging application, for the target device, and receive the one or more inputs or the one or more outputs via the logging application window.

15. The system of claim 11, where the target device comprises a UNIX based device, and where the one or more inputs or the one or more outputs are provided via a UNIX command line.

16. The system of claim 11, where, when recording the one or more inputs or the one or more outputs associated with the user device, the DMZ log server is to:

store, in a database server, the one or more inputs or the one or more outputs.

17. The system of claim 11, where the one or more inputs or the one or more outputs comprises at least one of:

text input by the user via the user device,
text the user cuts, or copies, and pastes via the user device,
text the user copies and pastes via the user device,
a configuration file changes change made via the user device,
a database changes change made via the user device, or
a passwords password used by the user device.

18. A system comprising:

a particular server to:

receive login information from a user device, determine, based on the login information, a user identification (ID) of a user of the user device and an Internet protocol (IP) address of the user device, receive, from the user device, a name and an IP address of a target device to be connected to the user device, and provide, to a demilitarized (DMZ) log server and based on the name of the target device, the IP address of the target device, the user ID, and the IP address of the user device, a request to execute a logging application that records one or more inputs or one or more outputs associated with the user device and to connect the user device to the target device.

19. The system of claim 18, further comprising:

the DMZ log server, the DMZ log server being to:

receive the request from the particular server, verify the request based on the user ID, the IP address of the user device, the name of the target device, and the IP address of the target device, and connect the user device to the target device after the verifying of the request.

20. The system of claim 18, further comprising:

the DMZ log server, the DMZ log server being to:

receive the request from the first particular server, execute the logging application based on the request, provide, to the user device, a logging application window, associated with the logging application, for the target device, receive the one or more inputs or the one or more outputs via the logging application window, and store, in a database server, the one or more inputs or the one or more outputs.

21. The system of claim 18, where the target device comprises a UNIX based device, and where the one or more inputs or outputs are provided via a UNIX command line.

22. The method of claim 1, where the or more inputs or the one or more outputs associated with the user device are provided at a UNIX command line.

23. The method of claim 1, where the or more inputs or the one or more outputs associated with the user device include substitute user UNIX commands entered by the user.

* * * * *